United States Patent
Horio et al.

(10) Patent No.: US 9,223,060 B2
(45) Date of Patent: Dec. 29, 2015

(54) OPTICAL LAYERED BODY, POLARIZER, AND IMAGE DISPLAY DEVICE

(75) Inventors: Tomoyuki Horio, Tokyo (JP); Kenji Shirai, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 200 days.

(21) Appl. No.: 14/006,275

(22) PCT Filed: Mar. 22, 2012

(86) PCT No.: PCT/JP2012/057394
§ 371 (c)(1),
(2), (4) Date: Nov. 21, 2013

(87) PCT Pub. No.: WO2012/128333
PCT Pub. Date: Sep. 27, 2012

(65) Prior Publication Data
US 2014/0071528 A1    Mar. 13, 2014

(30) Foreign Application Priority Data
Mar. 23, 2011   (JP) ................. 2011-064332

(51) Int. Cl.
*G02B 1/11* (2015.01)
*G02B 1/10* (2015.01)
*G02B 5/30* (2006.01)

(52) U.S. Cl.
CPC *G02B 1/11* (2013.01); *G02B 1/105* (2013.01); *G02B 5/3025* (2013.01); *Y10T 428/31551* (2015.04)

(58) Field of Classification Search
CPC ........ G02B 1/11; G02B 1/105; G02B 5/3025; Y10T 428/31551

USPC ............ 359/229, 488.01, 601–609, 613, 614
See application file for complete search history.

(56) References Cited

U.S. PATENT DOCUMENTS

| | | | | |
|---|---|---|---|---|
| 6,449,093 | B2* | 9/2002 | Hebrink et al. | 359/489.15 |
| 7,824,043 | B2* | 11/2010 | Hatano et al. | 359/601 |
| 7,991,257 | B1* | 8/2011 | Coleman | 385/129 |
| 2007/0287009 | A1* | 12/2007 | Okude et al. | 428/411.1 |

(Continued)

FOREIGN PATENT DOCUMENTS

| | | |
|---|---|---|
| CN | 1519621 | 8/2004 |
| CN | 1627106 | 6/2005 |

(Continued)

OTHER PUBLICATIONS

Machine Translation of JP 2009-242,497 from https://www4.j-platpat.inpit.go.jp/cgi-bin/tran_web_cgi_ejje?u=http://www4.j-platpat.inpit.go.jp/eng/translation/20150602020014184687764161944314099050452F3FB878D527FCD698DFBD3A12 on Jun. 1, 2015.*

*Primary Examiner* — Frank Font
(74) *Attorney, Agent, or Firm* — Hamre, Schumann, Mueller & Larson, P.C.

(57) ABSTRACT

Provided is an optical layered body having excellent antistatic property and optical properties.
An optical layered body including a light-transmitting substrate and a hard coat layer on at least one surface of the light-transmitting substrate, wherein the hard coat layer contains antimony pentoxide and a urethane resin, and the antimony pentoxide is dispersed in the hard coat layer while forming a three-dimensional net structure.

7 Claims, 2 Drawing Sheets

(56) References Cited

U.S. PATENT DOCUMENTS

| | | | |
|---|---|---|---|
| 2008/0316404 A1* | 12/2008 | Yamaki et al. | 349/118 |
| 2009/0086320 A1* | 4/2009 | Yoshihara et al. | 359/493 |
| 2009/0237786 A1* | 9/2009 | Yoshihara et al. | 359/488 |
| 2010/0134879 A1* | 6/2010 | Yoshihara et al. | 359/361 |
| 2010/0177398 A1* | 7/2010 | Watanabe et al. | 359/614 |
| 2010/0238548 A1* | 9/2010 | Watanabe et al. | 359/493 |

FOREIGN PATENT DOCUMENTS

| | | |
|---|---|---|
| JP | 5-339306 | 12/1993 |
| JP | 11-042729 | 2/1999 |
| JP | 2001-072929 | 3/2001 |
| JP | 2001-253004 | 9/2001 |
| JP | 2002-003751 | 1/2002 |
| JP | 2004-338379 | 12/2004 |
| JP | 2005-005064 | 1/2005 |
| JP | 2005-154749 | 6/2005 |
| JP | 2005-193496 | 7/2005 |
| JP | 2007-334134 | 12/2007 |
| JP | 2009-242497 | 10/2009 |
| TW | 200942969 | 10/2009 |

* cited by examiner

OPTICAL LAYERED BODY, POLARIZER, AND IMAGE DISPLAY DEVICE

TECHNICAL FIELD

The present invention relates to an optical layered body, a polarizer, and an image display device.

BACKGROUND ART

In the outermost surfaces of image display devices such as a cathode-ray tube display device (CRT), a liquid crystal display (LCD), a plasma display (PDP), an electroluminescence display (ELD), a field emission display (FED), a touch panel, a tablet PC, and electronic paper, an optical layered body composed of functional layers having various properties such as an anti-glare property, a reflection prevention property, and an antistatic property is formed.

As a substrate of such an optical layered body, a plastic substrate of an acrylic resin or the like excellent in transparency and hardness is used. However, such a plastic substrate tends to be electrified owing to a high insulation property and to be stained owing to deposition of dust or the like, and thus has a problem of causing a hindrance owing to the electrification not only in the case of its use but also in display production process.

In order to prevent such electrification, conventionally, an antistatic layer containing an antistatic agent has been formed partially in the above-mentioned optical layered body.

Those known as the antistatic agent are it conjugated conductive organic compounds; metals such as aluminum and copper and alloys; metal oxide conductive ultrafine particles of antimony tin oxide (ATO), indium tin oxide (ITO) and the like; organic conductive polymers; and conductive fine particles of quaternary ammonium salts and the like (Patent Documents 1 to 5).

However, in the case of using the antistatic agent, the addition amount of the antistatic agent needs to be increased for increasing the conductivity of the optical layered body and as a result, the haze of the optical layered body is increased and the light transmittance is lowered and it results in a problem that sufficient optical properties cannot be obtained.

CITATION LIST

Patent Literatures

Patent Literature 1: JP H05-339306 A
Patent Literature 2: JP H11-42729 A
Patent Literature 3: JP 2002-3751 A
Patent Literature 4: JP 2004-338379 A
Patent Literature 5: JP 2005-154749 A

SUMMARY OF INVENTION

Technical Problem

In view of the above state of the art, it is an object of the present invention to provide an optical layered body having an antistatic property and optical properties such as light transmittance and low haze and at the same time excellent in hardness and adhesion.

Solution to Problem

The present invention provides an optical layered body comprising a light-transmitting substrate and a hard coat layer on at least one surface of the light-transmitting substrate, wherein the hard coat layer contains antimony pentoxide and a hexa- or higher functional urethane (meth)acrylate oligomer with a weight average molecular weight of not lower than 1000 and lower than 10000; a content of the antimony pentoxide is 15 to 70% by mass in the hard coat layer; a content of the urethane (meth)acrylate oligomer is 30 to 70% by mass in the hard coat layer; and the antimony pentoxide is dispersed in the hard coat layer while forming a three-dimensional net structure.

It is preferable that the hard coat layer further contains at least one selected from the group consisting of pentaerythritol tri(meth)acrylate, dipentaerythritol hexa(meth)acrylate, pentaerythritol tetra(meth)acrylate, and trimethylolpropane tri(meth)acrylate.

It is preferable that the hard coat layer contains 30 to 70% by mass of pentaerythritol tri(meth)acrylate and/or dipentaerythritol hexa(meth)acrylate in the resin components.

It is preferable that the optical layered body of the present invention further comprises a low refractive index layer on the hard coat layer.

The present invention also provides a polarizer comprising a polarizing element, wherein the polarizer comprises the above-mentioned optical layered body on the polarizing element surface.

The present invention also provides an image display device comprising the optical layered body or the polarizer.

Hereinafter, the present invention will be described in detail.

The present invention provides an optical layered body having a light-transmitting substrate and a hard coat layer on at least one surface of the light-transmitting substrate, wherein the hard coat layer contains prescribed amounts of antimony pentoxide and a specified urethane (meth)acrylate oligomer; and the antimony pentoxide is dispersed in the hard coat layer in a specified state. Accordingly, the optical layered body of the present invention has an excellent antistatic property and low haze and is excellent in light transmittance and hardness.

In the optical layered body of the present invention, the hard coat layer contains antimony pentoxide and a urethane (meth)acrylate oligomer, and the antimony pentoxide is dispersed in the hard coat layer while forming a three-dimensional net structure.

The three-dimensional net structure refers to a state where antimony pentoxide molecules are dispersed so adjacently and continuously as to keep electric communication one another and exist in a net-like state observed in a cross section of the optical layered body. Since the antimony pentoxide exists in the hard coat layer while being dispersed in such a specified state, even if the addition amount of the antimony pentoxide is small, the optical layered body of the present invention can exhibit an excellent antistatic property.

In addition, the three-dimensional net structure can be confirmed by observing a cross section of the hard coat layer in the thickness direction by TEM or the like, and for example, in the case of the optical layered body of the present invention, regions (dense regions) where a large number of antimony pentoxide molecules densely and adjacently exist and regions (sparse regions) where antimony pentoxide molecules scarcely exist are observed in the cross section of the hard coat layer in the thickness direction by TEM, whereas in the case where the antimony pentoxide does not form a three-dimensional net structure, the antimony pentoxide is observed in approximately evenly dispersed state by the cross sectional TEM observation. However, in the optical layered body of the present invention, the electric communication of the antimony pentoxide molecules contained in the hard coat layer is not disconnected in the sparse regions of the hard coat layer by the cross sectional TEM observation, and the antimony pentoxide molecules are dispersed so continuously and adjacently as to keep the electric communication one another in the cross section and even in portions that do not appear in the cross section.

That is, in the optical layered body of the present invention, the cross sectional surface areas of the antimony pentoxide molecules per unit surface area are uneven in the cross section of the hard coat layer in the thickness direction, whereas in the case where the antimony pentoxide does not form a three-dimensional net structure, the cross sectional surface areas of the antimony pentoxide molecules per unit surface area are approximately even in the cross section of the hard coat layer in the thickness direction. Specifically, for example, in the case where the content of the antimony pentoxide in the hard coat layer is adjusted to the range as described below and 10 regions of 500 nm×500 nm are arbitrarily selected in the cross section of the hard coat layer in the thickness, direction by TEM observation, the ratio of the cross sectional surface area of the antimony pentoxide to the respective regions is 1 to 15% in the lowest content region and 60 to 80% in the highest content region. In contrast, when the ratio of the cross sectional surface area of the antimony pentoxide to the respective regions is measured in the same manner for a hard coat layer in which antimony pentoxide in the same amount does not form a three-dimensional net structure, the ratio is 20 to 50% in all of the regions.

Further, since the antimony pentoxide forms the above-mentioned three-dimensional net structure in the hard coat layer, the surface resistance value of the hard coat layer can be low (e.g., in the case where the content of the antimony pentoxide in the hard coat layer is in the range as described below, it may be lower than $1 \times 10^{12} \Omega/\square$). On the other hand, for example, in the case of a hard coat layer in which an antistatic agent in the same amount as that of the antimony pentoxide in the present invention is evenly dispersed or in the case of a hard coat layer in which antimony pentoxide forms agglomerates but does not form the above-mentioned three-dimensional net structure, such a low surface resistance value cannot be obtained.

In the present invention, since an excellent antistatic property can be obtained even if the addition amount of antimony pentoxide, which is an antistatic agent, is low, an optical layered body can be provided which is also excellent in optical properties without being affected in haze and light transmittance.

Hereinafter, the configuration of the optical layered body of the present invention will be described.

<Hard Coat Layer>

The optical layered body of the present invention has a hard coat layer.

The hard coat layer contains antimony pentoxide and a urethane resin. Further, in the hard coat layer, the antimony pentoxide is so dispersed as to form a three-dimensional net structure as described above. Accordingly, the optical layered body of the present invention is excellent in antistatic property and optical properties.

In this specification, the hard coat layer refers to a cured coating layer unless otherwise specified.

The antimony pentoxide is not particularly limited, but it is preferable to have a pyrochlore-type structure since having high conductivity and being capable of suitably providing an antistatic property with a small amount of addition.

The pyrochlore-type structure means a structure in which antimony pentoxide molecules have a regular tetrahedron form of which the respective apexes are shared in common to form a three-dimensionally connected structure.

The antimony pentoxide has high hydrophilicity since containing water molecule in the respective molecules, whereas the urethane (meth)acrylate oligomer has high hydrophobicity, and therefore the antimony pentoxide and the urethane (meth)acrylate oligomer are not good in compatibility with each other and tend to agglomerate. On the other hand, since having ion conductivity, the antimony pentoxide having the pyrochlore-type structure tends to form the three-dimensional net structure.

The antimony pentoxide preferably has an average primary particle diameter of 10 to 100 nm. If it is lower than 10 nm, the three-dimensional net structure may not be probably formed. If it exceeds 100 nm, proper agglomeration is not generated and thus the three-dimensional net structure may not be probably formed or the agglomerates may probably become large to increase haze. The average primary particle diameter is more preferably 30 to 70 nm.

The average primary particle diameter is a value measured by the heterodyne method.

The content of the antimony pentoxide in the hard coat layer is 7 to 35% by mass. If it is lower than 7% by mass, the three-dimensional net structure is not formed and the antistatic property becomes insufficient. If it exceeds 35% by mass, haze may be high and the adhesion of the hard coat layer to a light-transmitting substrate may be lowered. The content of the antimony pentoxide in the hard coat layer is preferably 10 to 30% by mass.

The urethane (meth)acrylate oligomer is not particularly limited and may include those which are publicly known and obtained by the reaction of polyols and organic polyisocyanates.

Examples of the polyol may include neopentyl glycol, 3-methyl-1,5-pentanediol, ethylene glycol, propylene glycol, 1,4-butanediol, 1,6-hexanediol, trimethylolpropane, pentaerythritol, tricyclodecanedimethylol, bis[hydroxymethyl]-cyclohexane, and the like; polyester polyols obtained by the reaction of these polyols and polybasic acids (e.g., succinic acid, phthalic acid, hexahydrophthalic acid anhydride, terephthalic acid, adipic acid, azelaic acid, tetrahydrophthalic acid anhydride, and the like); polycaprolactone polyols obtained by the reaction of these polyols and ε-caprolactone; polycarbonate polyols (e.g., polycarbonate diols obtained by the reaction of 1,6-hexanediol and diphenyl carbonate); and polyether polyols. Examples of the polyether polyol may include polyethylene glycol, polypropylene glycol, polytetramethylene glycol, ethylene oxide-modified bisphenol A, and the like.

Examples of the organic polyisocyanate include isophorone diisocyanate, hexamethylene diisocyanate, tolylene diisocyanate, xylene diisocyanate, diphenylmethane-4,4'-diisocyanate, dicyclopentanyl isocyanate, and the like.

Especially, the urethane (meth)acrylate oligomer is preferably urethane (meth)acrylate oligomers obtained by the reaction of the polyols, the organic polyisocyanates, and hydroxy (meth)acrylate compounds. In this specification, "(meth)acrylate" refers to acrylate and methacrylate.

Examples of the hydroxy(meth)acrylate compound include pentaerythritol tri(meth)acrylate, pentaerythritol di(meth)acrylate, dipentaerythritol penta(meth)acrylate, dipentaerythritol tetra(meth)acrylate, hydroxyethyl (meth) acrylate, hydroxypropyl (meth)acrylate, hydroxybutyl (meth)acrylate, dimethylolcyclohexyl mono(meth)acrylate, hydroxycaprolactone (meth)acrylate, and the like.

Especially, pentaerythritol tri(meth)acrylate and dipentaerythritol penta(meth)acrylate are preferable in terms of hardness.

The urethane (meth)acrylate oligomer has a weight average molecular weight of not lower than 1000 and lower than 10000. If it is lower than 1000, the three-dimensional net structure of the antimony pentoxide is not formed and the antistatic property becomes insufficient. If it is not lower than 10000, the antimony pentoxide in the form of a composition for forming the hard coat layer is agglomerated and cannot be dispersed and thus the composition cannot be applied. The weight average molecular weight is preferably not lower than 1000 and not higher than 7000.

The weight average molecular weight is a value measured by the gel permeation chromatography (GPC) method (in terms of styrene).

The urethane (meth)acrylate oligomer is a hexa- or higher functional oligomer. If the urethane (meth)acrylate oligomer is a penta- or lower functional oligomer, the hardness of the hard coat layer is lowered and the adhesion to a light-transmitting substrate is worsened. The lower limit of the number of functional groups of the urethane (meth)acrylate oligomer is preferably 6 and the upper limit thereof is preferably 20.

Commercialized products may be used as the urethane (meth)acrylate oligomer. Examples of the commercialized products that can be used as the urethane (meth)acrylate oligomer in the present invention may include UV 1700B (weight average molecular weight 2000, deca-functional) and UV 7600B (weight average molecular weight 1500, hexa-functional) manufactured by The Nippon Synthetic Chemical Industry Co., Ltd.; DPHA 40H (weight average molecular weight 7000, deca-functional), UX 5000 (weight average molecular Weight 1000, hexa-functional), and UX 5003 (weight average molecular weight 7000, hexa-functional) manufactured by Nippon Kayaku Co., Ltd.; UN 3320HS (weight average molecular weight 5000, pentadeca-functional), UN 904 (weight average molecular weight 4900, pentadeca-functional), UN 3320HC (weight average molecular weight 1500, deca-functional), and UN 3320HA (weight average molecular weight 1500, hexa-functional) manufactured by Negami Chemical Industrial Co., Ltd.; BS 577 (weight average molecular weight 1000, hexa-functional) manufactured by ARAKAWA CHEMICAL INDUSTRIES, LTD.; U 15HA (weight average molecular weight 2000, pentadeca-functional) manufactured by Shin-Nakamura Chemical Co., Ltd.; and the like.

Especially, in terms of antistatic property, hardness, and excellence in adhesion to a substrate, UV 1700B, DPHA 40H, UV 7600B, BS 577, BS 577CP, and UX 5000 are preferable.

Further, in terms of the adhesion property of the hard coat layer to a light-transmitting substrate after durability test, UV 1700B and DPHA 40H are more preferable.

The content of the urethane (meth)acrylate oligomer is 30 to 70% by mass in the resin components of the hard coat layer. If it is lower than 30% by mass, the urethane (meth)acrylate oligomer is in a small amount so that the viscosity of the composition for forming the hard coat layer may be low, the three-dimensional net structure of the antimony pentoxide cannot be formed, and the antistatic property of the optical layered body of the present invention may be worsened. If it exceeds 70% by mass, the viscosity of the composition becomes too high to form the hard coat layer.

The content of the urethane (meth)acrylate oligomer is more preferably 30 to 50% by mass in the resin components of the hard coat layer.

The hard coat layer may further contain a resin other than the urethane (meth)acrylate oligomer.

Examples of the resin other than the urethane (meth)acrylate oligomer may include ionizing-radiation curable resins which are cured by ultraviolet rays or electron beams, mixtures of ionizing-radiation curable resins and solvent drying resins (e.g., thermoplastic resins, that is, resins to form a coating film only by drying a solvent added for adjusting the solid matter at the time of coating), and thermosetting resins. More preferred are ionizing-radiation curable resins. In this specification, the "resin" means a concept including resin components such as monomers and oligomers.

Examples of the ionizing-radiation curable resin may include compounds having one or more unsaturated bonds such as compounds having functional groups of acrylates and the like. Examples of the compound having one unsaturated bond may include ethyl (meth)acrylate, ethylhexyl (meth)acrylate, styrene, methylstyrene, N-vinylpyrrolidone, and the like. Examples of the compound having two or more unsaturated bonds may include polyfunctional compounds such as polymethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, pentaerythritol tetra (meth)acrylate, trimethylolpropane tri(meth)acrylate, 1,6-hexanediol di(meth)acrylate, and neopentyl glycol di(meth)acrylate; reaction products of the polyfunctional compounds and (meth)acrylates and the like (e.g., polyol poly(meth)acrylate esters); modified compounds of the polyfunctional compounds; and the like.

Those usable as the ionizing-radiation curable resin are also polyester resins, polyether resins, acrylic resins, epoxy resins, alkyd resins, spiroacetal resins, polybutadiene resins, polythiol-polyene resins, and the like each having a relatively low molecular weight and having an unsaturated double bond.

Those preferable as the resin to be added as a binder resin other than the urethane (meth)acrylate oligomer are specifically ester compounds of polyol and (meth)acrylic acid such as dimethyloltricyclodecane diacrylate, (ethoxylated)bisphenol A diacrylate, (propoxylated)bisphenol A diacrylate, cyclohexanedimethanol diacrylate, (poly)ethylene glycol diacrylate, (ethoxylated)-1,6-hexanediol diacrylate, (propoxylated)-1,6-hexanediol diacrylate, (ethoxylated)neopentyl glycol diacrylate, (propoxylated)neopentyl glycol diacrylate, hydroxypivalic acid neopentyl glycol diacrylate, pentaerythritol tri(meth)acrylate, pentaerythritol tetra(meth)acrylate, trimethylolpropane tri(meth)acrylate, ethylene oxide-modified trimethylolpropane tri(meth)acrylate, propylene oxide-modified trimethylolpropane tri(meth)acrylate, tris(acryloxyethyl)isocyanurate, caprolactone-modified tris(acryloxyethyl)isocyanurate, trimethylolethane tri(meth)acrylate, dipentaerythritol tetra(meth)acrylate, dipentaerythritol penta(meth)acrylate, dipentaerythritol hexa(meth)acrylate, alkyl-modified dipentaerythritol tri(meth)acrylate, alkyl-modified dipentaerythritol tetra(meth)acrylate, alkyl-modified dipentaerythritol penta (meth)acrylate, caprolactone-modified dipentaerythritol hexa(meth)acrylate, and 1,2,3-cyclohexane tetra(meth)acrylate; and polyfunctional poly(meth)acrylate compounds such as polyurethane poly(meth)acrylate, polyester poly(meth)acrylate, polyether poly(meth)acrylate, polyacryl poly(meth)acrylate, polyalkyd poly(meth)acrylate, polyepoxy poly(meth)acrylate, polyspiroacetal poly(meth)acrylate, polybutadiene poly(meth)acrylate, polythiol polyene poly(meth)acrylate, and polysilicon poly(meth)acrylate in terms of excellence in scratching resistance and solvent resistance and strong and cured coating film formability.

Especially, it is preferable that the hard coat layer further contains at least one compound selected from the group consisting of pentaerythritol tri(meth)acrylate, dipentaerythritol hexa(meth)acrylate, pentaerythritol tetra(meth)acrylate, and trimethylolpropane tri(meth)acrylate.

The content of the resin other than the urethane (meth) acrylate oligomer is preferably 30 to 70% by mass in the hard coat layer. If it is lower than 30% by mass, the coating quality of the hard coat layer is weak and scratches may tend to be probably formed. Further, the adhesion of the hard coat layer to a light-transmitting substrate may be probably worsened. If it exceeds 70% by mass, the antistatic property may not be probably exhibited (the three-dimensional net structure of the antimony pentoxide may not be formed). The interlayer adhesion may be probably worsened at the time of layering another layer on the hard coat layer.

The content of the resin other than the urethane (meth) acrylate oligomer is more preferably 50 to 70% by mass in the hard coat layer.

The hard coat layer may contain other components besides the antimony pentoxide, urethane (meth)acrylate oligomer, and resin other than the urethane (meth)acrylate oligomer if necessary. Examples of the other components may include a photopolymerization initiator, a leveling agent, a polymerization promoter, an ultraviolet absorbent, an antioxidant, a refractive index adjustment agent, and the like.

The hard coat layer preferably has a thickness of 0.5 to 8 μm. If it is thinner than 0.5 μm, pencil hardness and scratching resistance may possibly be worsened. Further, since the total amount of particles per unit surface area becomes low, the antistatic properties may be probably worsened. If it exceeds 8 μm, haze is increased and total light transmittance is lowered and curling and cracking may be caused and further, it also results in an increase in production cost.

The thickness is more preferably 1 to 4 μm.

The hard coat layer can be formed with the use of a composition for a hard coat layer prepared by mixing and dispersing the antimony pentoxide, urethane (meth)acrylate oligomer, and if necessary, resin other than the urethane (meth) acrylate oligomer, and other components with and in a solvent.

Example of the solvent may include alcohols (e.g., methanol, ethanol, propanol, isopropyl alcohol, n-butanol, sec-butanol, tert-butanol, benzyl alcohol, PGME, ethylene glycol), ketones (e.g., acetone, methyl ethyl ketone, methyl isobutyl ketone, cyclopentanone, cyclohexanone, heptanone, diisobutyl ketone, diethyl ketone), aliphatic hydrocarbons (e.g., hexane, cyclohexane), halo-hydrocarbons (e.g., methylene chloride, chloroform, tetrachloromethane), aromatic hydrocarbons (e.g., benzene, toluene, xylene), amides (e.g., dimethylformamide, dimethylacetamide, n-methylpyrrolidone), ethers (e.g., diethyl ether, dioxane, tetrahydrofuran), esters (e.g., methyl acetate, ethyl acetate, butyl acetate, PGMEA), and the like.

Especially, as the solvent, PGME is preferable since having good dispersibility of antimony pentoxide. PGME is preferably contained in an amount of not lower than 15% by mass in the solvent.

The mixing and dispersion method is not particularly limited and publicly known methods may be employed by using a publicly known device such as a paint shaker, a beads mill, or a kneader.

The hard coat layer can be formed by forming a coating film with the application of the composition for a hard coat layer to a light-transmitting substrate as described below, and drying the coating film if necessary, followed by curing the coating film.

Examples of the application method may include various known methods such as a spin coat method, a dip method, a spray method, a die coat method, a bar coat method, a roll coater method, a meniscus coater method, a flexo printing method, a screen printing method, and a bead coater method.

The drying method is carried out preferably at 50 to 100° C. for 15 to 120 seconds.

The curing method of the coating film may be selected properly depending on the contents or the like of the composition. For example, if the composition is an ultraviolet-curable composition, the coating film may be cured by the radiation of ultraviolet rays.

The hard coat layer thus formed contains antimony pentoxide dispersed therein while forming a three-dimensional net structure. The reason for this is not made clear; however, as described above, it is supposed that use of antimony pentoxide having a pyrochlore structure in the composition for a hard coat layer makes the compatibility with the urethane (meth)acrylate oligomer worse and makes agglomerate formation easy, and the antimony pentoxide having a pyrochlore structure tends to form the three-dimensional net structure easily since it has ion conductivity.

The hard coat layer in the optical layered body of the present invention is composed of specified components including antimony pentoxide and a urethane (meth)acrylate oligomer as described above, and the antimony pentoxide exists in the hard coat layer while being so dispersed as to form a three-dimensional net structure. As a result, the optical layered body can be excellent in antistatic property, optical properties, and hardness. Further, the addition amount of a material (antimony) with a high refractive index can be lessened in the thus formed hard coat layer.

<Light-Transmitting Substrate>

The optical layered body of the present invention has a light-transmitting substrate.

The light-transmitting substrate is preferably a substrate which is provided with high transmittance, smoothness and heat resistance and is excellent in mechanical strength.

Specific examples of a material forming the light-transmitting substrate include thermoplastic resins such as polyethylene terephthalate (PET), polyethylene naphthalate, polybutylene terephthalate, polybutylene naphthalate, triacetyl cellulose (TAC), cellulose diacetate, cellulose acetate butyrate, polyamide, polyimide, polyether sulfone, polysulfone, polypropylene (PP), cycloolefin polymer (COP), cycloolefin copolymer (COC), polymethylpentene, polyvinyl chloride, polyvinyl acetal, polyether ketone, polymethyl methacrylate, polycarbonate, and polyurethane. Preferred may include polyethylene terephthalate.

The light-transmitting substrate preferably has a thickness of 4 to 300 μm and more preferably 5 μm in the lower limit and 200 μm in the upper limit.

The light-transmitting substrate may be previously subjected to physical treatment such as corona discharge treatment, saponification, or oxidation treatment as well as to application of an anchor agent or a coating material such as a primer in order to improve the adhesion to the layer to be formed thereon.

<Low Refractive Index Layer>

It is preferable that the optical layered body of the present invention further contains a low refractive index layer.

Formation of the low refractive index layer makes the optical layered body excellent in reflection prevention property.

The low refractive index layer is preferably a layer having a lower refractive index than that of the hard coat layer. In a preferred embodiment of the present invention, the hard coat layer has a refractive index of not lower than 1.5, and the low refractive index layer has a refractive index of lower than 1.5. The hard coat layer more preferably has a refractive index of not lower than 1.55, and furthermore preferably not lower than 1.58. The low refractive index layer more preferably has a refractive index of not higher than 1.42, and furthermore preferably not higher than 1.37.

The low refractive index layer may be formed by any of 1) a resin containing silica or magnesium fluoride; 2) a fluoro material, which is a low refractive index resin; 3) a fluoro material containing silica or magnesium fluoride; and 4) a thin film of silica or magnesium fluoride.

The fluoro material is a polymerizable compound containing at least a fluorine atom in the molecule or its polymer. The polymerizable compound is not particularly limited, and preferred are those having a curing reactive group such as a functional group cured by ionizing radiation (ionizing-radiation curable group) or a polar group cured by heat (thermosetting polar group). Further, compounds having these reactive groups simultaneously may also be used.

As the fluorine atom-containing polymerizable compound having an ionizing-radiation curable group, a wide variety of fluorine-containing monomers having ethylenic unsaturated bonds can be used. Specific examples thereof may include fluoroolefins (e.g., fluoroethylene, vinylidene fluoride, tetrafluoroethylene, hexafluoropropylene, perfluorobutadiene, perfluoro-2,2-dimethyl-1,3-dioxole, etc.). Examples of compounds having a (meth)acryloyloxy group include (meth)acrylate compounds having fluorine atoms in the molecule such as 2,2,2-trifluoroethyl (meth)acrylate, 2,2,3,3,3-pentafluoropropyl (meth)acrylate, 2-(perfluorobutyl)ethyl (meth)acrylate, 2-(perfluorohexyl)ethyl (meth)acrylate, 2-(perfluorooctyl)ethyl (meth)acrylate, 2-(perfluorodecyl)ethyl (meth)acrylate, methyl α-trifluoromethacrylate, and ethyl α-trifluoromethacrylate; fluorine-containing polyfunctional (meth)acrylic acid ester compounds having a fluoroalkyl group, fluorocycloalkyl group or fluoroalkylene group with 1 to 14 carbon atoms, each of which has at least three fluorine atoms in the molecule, and also at least two (meth)acryloyloxy groups; and the like.

Examples of the fluorine atom-containing polymerizable compound having a thermosetting polar group may include 4-fluoroethylene-perfluoroalkylvinyl ether copolymers; fluoroethylene-hydrocarbon vinyl ether copolymers; fluorine-modified products of resins such as an epoxy resin, a polyurethane resin, a cellulose resin, a phenolic resin, and a polyimide resin; and the like. Examples of the thermosetting polar group may preferably include hydrogen bond-formable groups such as a hydroxyl group, a carboxyl group, an amino group, and an epoxy group. These groups are excellent not only in adhesion to the coating film but also in affinity with inorganic ultrafine particles such as silica.

Examples of the polymerizable compound (fluoro resin) having an ionizing-radiation curable group and a thermosetting polar group may include partially or completely fluorinated alkyl, alkenyl, aryl esters of acrylic or methacrylic acid; completely or partially fluorinated vinyl ethers; completely or partially fluorinated vinyl esters; completely or partially fluorinated vinyl ketones; and the like.

Examples of the polymer of the fluorine atom-containing polymerizable compound may include polymers of a monomer or monomer mixture containing at least one fluorine-containing (meth)acrylate compound of the polymerizable compound having an ionizing-radiation curable group; copolymers of at least one fluorine-containing (meth)acrylate compound with a (meth)acrylate compound having no fluorine atom in the molecule such as methyl (meth)acrylate, ethyl (meth)acrylate, propyl (meth)acrylate, butyl (meth)acrylate, or 2-ethylhexyl (meth)acrylate; homopolymers and copolymers of a fluorine-containing monomer such as fluoroethylene, vinylidene fluoride, trifluoroethylene, chlorotrifluoroethylene, 3,3,3-trifluoropropylene, 1,1,2-trichloro-3,3,3-trifluoropropylene, or hexafluoropropylene; and the like.

Silicone-containing vinylidene fluoride copolymers obtained by adding a silicone component to these copolymers are also usable as the polymer of the polymerizable compound. Examples of the silicon component in this case may include (poly)dimethylsiloxane, (poly)diethylsiloxane, (poly)diphenylsiloxane, (poly)methylphenylsiloxane, alkyl-modified (poly)dimethylsiloxane, azo group-containing (poly)dimethylsiloxane, dimethylsilicone, phenylmethylsilicone, alkyl/aralkyl-modified silicone, fluorosilicone, polyether-modified silicone, fatty acid ester-modified silicone, methylhydrosilicone, silanol group-containing silicone, alkoxy group-containing silicone, phenol group-containing silicone, methacryl-modified silicone, acryl-modified silicone, amino-modified silicone, carboxylic acid-modified silicone, carbinol-modified silicone, epoxy-modified silicone, mercapto-modified silicone, fluoro-modified silicone, polyether-modified silicone, and the like. Especially, preferred are those having a dimethylsiloxane structure.

Besides the above-mentioned compounds, further usable as the fluoro resin are compounds obtained by the reaction of a fluorine—containing compound having at least one isocyanato group in the molecule with a compound having at least one functional group reactive with the isocyanato group such as an amino group, a hydroxyl group, or a carboxyl group in the molecule; compounds obtained by the reaction of a fluorine-containing polyol such as a fluorine-containing polyether polyol, a fluorine-containing alkyl polyol, a fluorine-containing polyester polyol, or a fluorine-containing s-caprolactone-modified polyol with a compound having an isocyanato group; and the like.

At the time of forming the low refractive index layer, for example, a composition containing raw material components (composition for a low refractive index layer) is used for the formation. More specifically, the low refractive index layer can be obtained by using a solution or dispersion obtained by dissolving or dispersing the raw material components (resin and the like) and additives if necessary (e.g., "fine particles having voids" as described below, a polymerization initiator, an antistatic agent, a stain-proofing agent, an anti-glare agent, etc.) in a solvent as a composition for a low refractive index layer, and applying the composition to form a coating film, followed by curing the coating film. Publicly known additives may be used as the polymerization initiator, the antistatic agent, the stain-proofing agent, the anti-glare agent, etc. Addition of an organic antistatic agent can provide an antistatic property.

Examples of the solvent may include solvents which are the same as those usable for forming the hard coat layer. Especially, preferable solvents are methyl isobutyl ketone (MIBK), methyl ethyl ketone (MEK), isopropyl alcohol (IPA), n-butanol, sec-butanol, tert-butanol, propylene glycol monomethyl ether (PGME), and propylene glycol monomethyl ether acetate (PGMEA).

In a method for preparing the composition for a low refractive index layer, the components may be evenly mixed and the method may be performed according to a publicly known manner. For example, mixing and dispersion may be carried out by employing the publicly known apparatus as described above in the formation of the hard coat layer.

The low refractive index layer may be formed according to a publicly known manner. For example, various kinds of methods as described above in the formation of the hard coat layer can be employed.

In the low refractive index layer, it is preferable to use "fine particles having voids" as a low refractive index agent. The "fine particles having voids" can lower the refractive index of the low refractive index layer while keeping the layer strength. In the present invention, the "fine particles having voids" mean fine particles which form a structure by filling the inside of the fine particles with a gas and/or a porous structure containing a gas to lower the refractive index inversely proportional to the occupancy rate of the gas in the fine particles as compared with the original refractive index of the fine particles. In the present invention, the "fine particles having voids" also include fine particles which can form a nano-porous structure at least partially in the inside and/or surface depending on the form, configuration and agglomeration state of the fine particles, and the dispersion state of the fine particles in the inside of the coating film. The refractive index of the low refractive index layer containing the fine particles can be adjusted to 1.25 to 1.42.

Examples of inorganic fine particles having voids may include silica fine particles prepared by the method described in JP 2001-233611A. Further, silica fine particles prepared by the method described in JP H-07-133105 A, JP 2002-79616 A, or JP 2006-106714A are also usable. Since silica particles having voids are easy to be produced and have high hardness, in the case where the silica particles are mixed with a binder to form a low refractive index layer, the silica particles improve the layer strength and make it possible to adjust the refractive index to a range of about 1.20 to 1.45. Particularly, specific examples of organic fine particles having voids preferably include hollow polymer fine particles prepared by employing the technique disclosed in JP 2002-80503 A.

Examples of the fine particles which can form nano-porous structure at least partially in the inside and/or surface of the coating film may include, in addition to the previously mentioned silica fine particles, controlled-release materials which is produced for the purpose of increasing the specific surface area and which adsorbs various kinds of chemical substances on packed columns and porous parts in the surface, porous fine particles to be used for catalyst fixation, and dispersant and agglomerates of hollow fine particles to be incorporated in heat insulation materials and low dielectric coefficient materials. Specific examples of such fine particles to be used may be those having a particle diameter within a preferable range of the present invention among, as commercialized products, aggregates of porous silica fine particles of trade names: Nipsil and Nipgel manufactured by Nippon Silica Industrial Co., Ltd. and colloidal silica UP series (trade name), manufactured by Nissan Chemical Industries, Ltd., having a structure in which silica fine particles are bonded in a chain form.

The "fine particles having voids" preferably have an average particle diameter of not smaller than 5 nm and not larger than 300 nm, and more preferably 5 nm in the lower limit and 100 nm in the upper limit, and even more preferably 10 nm in the lower limit and 80 nm in the upper limit. If the average particle diameter of the fine particles is within this range, it is possible to impart excellent transparency to the low refractive index layer. The average particle diameter is a value measured by a dynamic light scattering method. The amount of the "fine particles having voids" is generally about 0.1 to 500 parts by mass and preferably about 10 to 200 parts by mass based on 100 parts by mass of the matrix resin in the low refractive index layer.

In the low refractive index layer formation, the viscosity of the composition for a low refractive index layer is preferably in a range of 0.5 to 5 cps (25° C.), in which preferable coatability is obtained, and more preferably in a range of 0.7 to 3 cps (25° C.). Adjustment of the viscosity to the above-mentioned range makes it possible to realize a layer excellent in visible light reflection prevention, to form a uniform thin film without coating undulation, and to form a low refractive index layer particularly excellent in adhesion to a substrate.

A curing means for the resin may be the same as that described for the hard coat layer. In the case where a light radiation means is employed for the curing treatment, it is preferable to add a photopolymerization initiator for starting polymerization of the polymerizable compound by generating, for example, radicals through light radiation to the fluoro resin composition.

The thickness (nm) $d_A$ of the low refractive index layer preferably satisfies the following expression (I):

$$d_A = m\lambda/(4n_A) \tag{I}$$

wherein, $n_A$ represents a refractive index of the low refractive index layer;

m represents a positive odd numeral and preferably 1;

$\lambda$ is a wavelength and represents a value preferably in a range of 480 to 580 nm.

In the present invention, the low refractive index layer preferably satisfies the following expression (II):

$$120 < n_A d_A < 145 \tag{II}$$

in terms of lowering the refractive index.

<Other Layers>

The optical layered body may have other arbitrary layers besides the light-transmitting substrate, the hard coat layer, and the low refractive index layer. Examples of the other arbitrary layers may include an anti-glare layer, a stain-proofing layer, a high refractive index layer, a middle refractive index layer, an antistatic layer, and the like. These layers may be formed, according to publicly known methods, by mixing publicly known anti-glare agents, low refractive index agents, high refractive index agents, antistatic agents, stain-proofing agents, and the like with a resin, a solvent, etc. Especially, it is preferable to further form a stain-proofing layer.

<Optical Layered Body>

The hardness of the optical layered body of the present invention is preferably not lower than H, more preferably not lower than 2H, and furthermore preferably not lower: than 3H when measured by a pencil hardness test (load 4.9 N) according to JIS K5600-5-4 (1999).

The optical layered body of the present invention preferably has a surface resistance value of not higher than $10^{12} \Omega/\square$.

If it exceeds $10^{12} \Omega/\square$, the antistatic property of interest may not be probably obtained. The surface resistance value is more preferably not higher than $10^{11} \Omega/\square$, and furthermore preferably not higher than $10^{10} \Omega/\square$.

The surface resistance value can be measured by a surface resistance value measurement apparatus (product number: Hiresta IP MCP-HT260, manufactured by Mitsubishi Chemical Corporation).

The optical layered body of the present invention preferably has a total light transmittance of not lower than 90%. If it is lower than 90%, in the case where the optical layered body of the present invention is installed on the surface of an image display device, the color reproducibility and the visibility may be probably deteriorated. The total light transmittance is more preferably not lower than 95%.

The total light transmittance can be measured by the method in accordance with JIS K-7361 by using a haze meter (product number; HM-150, manufactured by MURAKAMI COLOR RESEARCH LABORATORY).

The optical layered body of the present invention preferably has a haze of not higher than 0.7%. If it exceeds 0.7%, in the case of installation on a display surface, the light transmittance may be probably lowered and the visibility may be probably deteriorated and besides, the desired contrast may not be probably obtained. The haze is more preferably within a range of 0.2 to 0.7.

The haze can be measured by the method in accordance with JIS K-7136 by using a haze meter (product number; HM-150, manufactured by MURAKAMI COLOR RESEARCH LABORATORY).

Examples of a method for producing the optical layered body of the present invention include a method for forming a hard coat layer by using a composition for a hard coat layer on a light-transmitting substrate and forming a low refractive index layer on the formed hard coat layer by using a composition for a low refractive index layer.

The composition for a hard coat layer and the hard coat layer may be produced from materials and formation method which are the same as the materials and the formation method as described above.

The composition for a low refractive index layer and the low refractive index layer may also be produced from materials and formation method which are the same as the materials and the formation method as described above.

<Polarizer and Image Display Device>

The optical layered body of the present invention can be formed into a polarizer by forming a surface side of the optical layered body opposite to the surface where the hard coat layer of the light-transmitting substrate exists on the surface of a polarizing element. Such a polarizer is also included in the present invention.

The polarizing element is not particularly limited and for example, a polyvinyl alcohol film, a polyvinyl formal film, a polyvinyl acetal film, a saponified film including an ethylene-vinyl acetate copolymer, and the like which are dyed by iodine or the like and stretched may be used. In the lamination treatment of the polarizing element and the optical layered body, a saponification treatment is preferably carried out for the light-transmitting substrate. The adhesiveness is made excellent and an antistatic effect can be obtained by the saponification treatment. An adhesive may also be used for adhesion. Examples of the adhesive may include an acrylic pressure sensitive adhesive, a urethane pressure sensitive adhesive, a silicone pressure sensitive adhesive, an aqueous pressure sensitive adhesive, and the like.

An image display device can be equipped with the optical layered body of the present invention and the polarizer. Such an image display device is also included in the present invention.

Examples of the image display device include an LCD, a PDP, an FED, an ELD (organic EL, inorganic EL), a CRT, a touch panel, electronic paper, a tablet PC, and the like.

An LCD is equipped with a transmission display body and a light source device for irradiation of the transmission display body from the back side. In the case where the image display device of the present invention is an LCD, the optical layered body or polarizer is formed on the surface of the transmission display body.

In the case where the image display device is a liquid crystal device having the optical layered body of the present invention, the light source of the light source device irradiates light from the light-transmitting substrate side of the optical layered body. In addition, a retardation plate may be inserted between a liquid crystal display element and a polarizer in the case of STN type, VA type, and IPS type liquid crystal display devices. If necessary, an adhesive layer may be formed between respective layers of the liquid crystal display device.

A PDP has a front glass substrate (having an electrode on the surface) and a rear glass substrate (having an electrode, and fine grooves on the surface and red-, green-, and blue-phosphor layers in the grooves) arranged on the opposite to the front glass substrate while enclosing a discharge gas therebetween. In the case where the image display device of the present invention is a PDP, the optical layered body is formed on the surface of the front glass substrate or a front plate (a glass substrate or a film substrate).

Other image display devices may be an ELD device obtained by vapor depositing zinc sulfide and a diamine substance: a phosphor, which emit light when voltage is applied, on the glass substrate, for carrying out display by controlling the voltage to be applied to the substrate, or may be an image display device such as CRT for generating an image to be seen by the eyes of human being with electric signals being converted into light. In this case, the outermost surfaces of the display devices or the surfaces of their front plates are provided with the optical layered body described above.

Any optical layered body of the present invention can be used for displaying of a television, computer, and the like. Particularly, the image display device can be used suitably for the surfaces of displays for high definition images such as a liquid crystal panel, a PDP, an ELD, an FED, a touch panel, and electronic paper.

Advantageous Effects of Invention

Since having the above-mentioned configuration, the optical layered body of the present invention is excellent in antistatic property and optical properties.

Accordingly, the anti-glare properties of the present invention can be applied suitably for displays such as a cathode-ray display device (CRT), a liquid crystal display (LCD), a plasma display (PDP), and an electroluminescence display (ELD), and particularly high definition displays.

DESCRIPTION OF EMBODIMENTS

Figure 1:
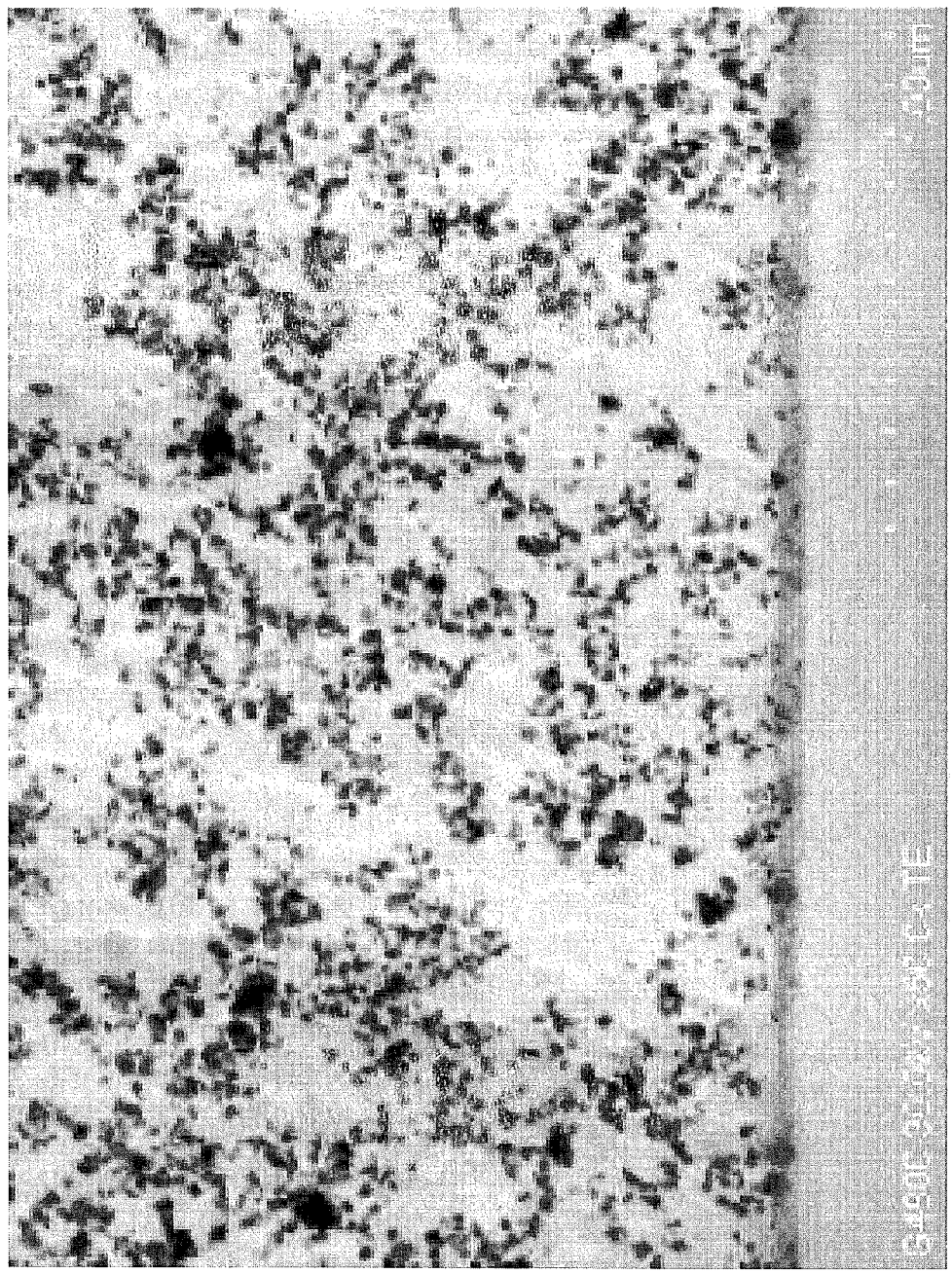
FIG. 1 is a TEM photograph of a cross section of a hard coat layer of an optical layered body according to Example 1.

Hereinafter, the present invention will be described more in detail with reference to Examples and Comparative Examples; however, the present invention should not be limited only to Examples and Comparative Examples.

In the specification, "part(s)" and "%" are based on weight unless otherwise specified.

Example 1

C 4106 (ultraviolet-curable conductive hard coat ink, manufactured by Pelnox, Ltd., solid matter about 32%, antimony pentoxide dispersant) was mixed with UV-7600 B [mixture of ultraviolet-curable urethane acrylate/pentaerythritol triacrylate (PETA)=65/35 (mass ratio), manufactured by The Nippon Synthetic Chemical Industry Co., Ltd.] and Irg 184 (photopolymerization initiator, manufactured by Ciba Japan) and the solid matter was re-adjusted to 45% by the following solvent mixture to obtain a composition for a hard coat layer. The mixing ratio of the obtained composition for a hard coat layer is shown in Table 1.

Solvent mixture: PGME/MEK/IPA/acetyl acetone=65/24/5/6

PGME, MEK, IPA: manufactured by THE INCTEC INC.

Acetyl acetone: manufactured by Daicel Chemical Industry, Ltd.

The composition for a hard coat layer was applied in a thickness of 3 μm and a dry weight of 6 g/m² onto an easily adhesive surface of A 1598 (PET film, manufactured by Toyobo Co., Ltd., thickness 100 μm) to form a coating film, which was then dried by heating at 70° C. for 1 minute in an oven and cured by the radiation of 100 mJ/cm² of ultraviolet rays to prepare a hard coat layer.

A composition for a low refractive index layer with composition as follows was then applied onto the hard coat layer thus formed to give a thickness of 0.1 μm after drying (70° C.×1 minute) so that a coating film was formed. Thereafter, the coating film was cured by the radiation of ultraviolet rays in a radiation dose of 200 mJ/cm² with the use of an ultraviolet radiation apparatus (light source H bulb, manufactured by Fusion UV System Japan KK) to obtain an optical layered body of Example 1. The thickness was adjusted so that the minimum value of the reflectance was made in a wavelength of around 550 nm.

(Composition for Low Refractive Index Layer)

Hollow treated silica fine particles (solid matter of the silica fine particles: 20% by mass, solution; methyl isobutyl ketone, average particle diameter: 50 nm) 65 parts by mass Pentaerythritol triacrylate (PETA) 10 parts by mass Polymerization initiator (Irgacure 127; manufactured by Ciba Specialty Chemicals Inc.) 0.35 parts by mass Silicone oil (X22164E; manufactured by Shin-Etsu Chemical Co., Ltd.) 1 part by mass MIBK 320 parts by mass PGME 161 parts by mass

TABLE 1

| Materials | parts by mass |
|---|---|
| C4106 | 33 |
| UV-7600B | 35 |
| Irg184 | 2 |
| PGME | 21 |
| MEK | 11 |
| IPA | 2 |
| Acetyl acetone | 3 |

Example 2

An optical layered body of Example 2 was prepared in the same manner as in Example 1, except that a mixture of UN 904 (mixture of ultraviolet-curable urethane acrylate/DPHA=80/20, manufactured by Negami Chemical Industrial Co., Ltd.) and PET 30 (PETA, manufactured by Nippon Kayaku Co., Ltd.) at a mass ratio of 7:3 was used in place of UV-7600B.

Example 3

An optical layered body of Example 3 was prepared in the same manner as in Example 1, except that UV 1700B (mixture of ultraviolet-curable urethane acrylate/DPHA=60/40, manufactured by The Nippon Synthetic Chemical Industry Co., Ltd.) was used in place of UV-7600B.

Example 4

An optical layered body of Example 4 was prepared in the same manner as in Example 1, except that DPHA 40H (mixture of ultraviolet-curable urethane acrylate/DPHA=60/40, manufactured by Nippon Kayaku Co., Ltd.) was used in place of UV-7600B.

Example 5

An optical layered body of Example 5 was prepared in the same manner as in Example 1, except that a mixture of UV 7600B (mixture of ultraviolet-curable urethane acrylate/PETA=65/35, manufactured by The Nippon Synthetic Chemical Industry Co., Ltd.) and PETA at a mass ratio of 60/40 was used in place of UV-7600B.

Example 6

An optical layered body of Example 6 was prepared in the same manner as in Example 1, except that a mixture of UV 7600B (mixture of ultraviolet-curable urethane acrylate/PETA=65/35, manufactured by The Nippon Synthetic Chemical Industry Co., Ltd.) and M315. (monomer, manufactured by TOAGOSEI CO., LTD.) at a mass ratio of 60/40 was used in place of UV-7600B.

Example 7

An optical layered body of Example 7 was prepared in the same manner as in Example 1, except that the mixing amount of C4106 was increased from 33 parts by mass to 47 parts by mass.

Example 8

An optical layered body of Example 8 was prepared in the same manner as in Example 1, except that the mixing amount of C4106 was decreased from 33 parts by mass to 12 parts by mass.

Comparative Example 1

An optical layered body of Comparative Example 1 was prepared in the same manner as in Example 1, except that UT-4660 (mixture of ultraviolet-curable urethane acrylate/PETA=20/80, manufactured by The Nippon Synthetic Chemical Industry Co., Ltd.) was used in place of UV-7600B.

Comparative Example 2

An optical layered body of Comparative Example 2 was prepared in the same manner as in Example 1, except that a mixture of UV-7600B/PET 30 (PETA, manufactured by Nippon Kayaku Co., Ltd.)=1/9 was used in place of UV-7600B.

Comparative Example 3

An optical layered body of Comparative Example 3 was prepared in the same manner as in Example 1, except that PET 30 (PETA, manufactured by Nippon Kayaku Co., Ltd.) was used in place of UV-7600B.

Comparative Example 4

An optical layered body of Comparative Example 4 was prepared in the same manner as in Example 1, except that DPHA (hexa-functional monomer, manufactured by Nippon Kayaku Co., Ltd.) was used in place of UV-7600B.

Comparative Example 5

An optical layered body of Comparative Example 5 was prepared in the same manner as in Example 1, except that EBECRYL 600 (epoxy acrylate, bifunctional, molecular weight 500, manufactured by Daicel-Cytec Company, Ltd.) was used in place of UV-7600B.

Comparative Example 6

An optical layered body of Comparative Example 6 was prepared in the same manner as in Example 1, except that M 8030 (polyester acrylate, manufactured by TOAGOSEI CO., LTD.) was used in place of UV-7600B.

Comparative Example 7

An optical layered body of Comparative Example 7 was prepared in the same manner as in Example 1, except that the mixing amount of C4106 was changed from 33 parts by mass to 5.5 parts by mass.

Comparative Example 8

An optical layered body of Comparative Example 8 was prepared in the same manner as in Example 1, except that the antistatic material was changed from antimony pentoxide to ATO.

Comparative Example 9

An optical layered body of Comparative Example 9 was prepared in the same manner as in Example 1, except that the mixing amount of C4106 was increased from 33 parts by mass to 50.5 parts by mass.

Comparative Example 10

An optical layered body of Comparative Example 10 was prepared in the same manner as in Example 1, except that the mixing amount of C4106 was increased from 33 parts by mass to 78 parts by mass.

Comparative Example 11

An optical layered body of Comparative Example 11 was prepared in the same manner as in Example 1, except that UN 904 (mixture of ultraviolet-curable urethane acrylate/DPHA=80/20, manufactured by Negami Chemical Industrial Co., Ltd.) was used in place of UV-7600B.

Comparative Example 12

An optical layered body of Comparative Example 12 was prepared in the same manner as in Example 1, except that UXT 6000 (urethane acrylate, molecular weight 6000, bifunctional, manufactured by Nippon Kayaku Co., Ltd.) was used in place of UV-7600B.

Comparative Example 13

A composition for a hard coat layer was prepared in the same manner as in Example 1, except that UX 3204 (urethane acrylate, molecular weight 13000, bifunctional, manufactured by Nippon Kayaku Co., Ltd.) was used in place of UV-7600B; however, antimony pentoxide was agglomerated and thus coating could not be carried out.

Comparative Example 14

A composition for a hard coat layer was prepared by using toluene in place of the solvent mixture; however, antimony pentoxide was agglomerated and thus coating could not be carried out.

Each of the obtained optical layered bodies was evaluated in the following items. Evaluation results are shown in Table 2.

(Surface Resistance Value Measurement)

The surface resistance value of each optical layered body obtained as mentioned above was measured by Hiresta IP MCP-HT 260 manufactured by Mitsubishi Chemical Corporation, and evaluated according to the following criteria.

Excellent: lower than $1 \times 10^{11} \Omega/\square$

Good: not lower than $1 \times 10^{11} \Omega/\square$ and lower than $1 \times 10^{12} \Omega/\square$ Poor: not lower than $1 \times 10^{12} \Omega/\square$ (Haze)

The haze of each optical layered body was measured by a method in accordance with JIS K-7136 with the use of a haze meter (product number; HM-150, manufactured by MURAKAMI COLOR RESEARCH LABORATORY) while a side of the PET substrate was stuck to glass.

(Total Light Transmittance)

The total light transmittance of each obtained optical layered body was measured by a method in accordance with JIS K-7361 with the use of a haze meter (product number; HM-150, manufactured by MURAKAMI COLOR RESEARCH LABORATORY).

(Adhesion)

Regarding the adhesion of the hard coat layer of each obtained optical layered body and the light-transmitting substrate, a cross-cut adhesion test was carried out and the ratio of the number of cut parts remaining on the light-transmitting substrate after the tape was peeled to the number of original cut parts (100) was evaluated according to the following criteria.

Good: 90/100 to 100/100

Acceptable: 50/100 to 89/100

Poor: 0/100 to 49/100

(Pencil Hardness)

After the humidity was adjusted for each optical layered body at a temperature of 25° C. and a relative humidity of 60% for 2 hours, the pencil hardness of the surface where the hard coat layer was formed was measured at a load of 4.9 N according to a pencil hardness evaluation method defined in JISK 5600-5-4 (1999) by using a pencil for a test (hardness HB to 3H) defined in JIS-S-6006. It is determined to be good when the pencil hardness is not lower than 3 H.

(Adhesion to Low Refractive Index Layer)

The surface of the low refractive index layer of each optical layered body was rubbed back and forth 10 times at a friction load of 300 g/cm² with the use of steel wool #0000 (trade name: BON STAR, manufactured by Nihon Steel Wool Co., Ltd.) and a black tape was stuck to the rear surface and the adhesion was evaluated by the naked eyes under light of a three-wavelength fluorescent lamp according to the following criteria.

Good: no scratch

Poor: scratches are observed

TABLE 2

|  | Composition ratio of binder resin in hard coat layer (mass %) | | | Antimony pentoxide content in hard coat layer (mass %) | Surface resistance value | Haze (%) | Total light transmittance (%) | Adhesion to substrate | Pencill hardness | Adhesion to LR layer (Resistance to SW) |
|---|---|---|---|---|---|---|---|---|---|---|
|  | Urethane acrylate | DPHA | PETA | | | | | | | |
| Example 1 | 65 | 0 | 35 | 23 | Good | 0.5 | Good | Good | 3H | Good |
| Example 2 | 56 | 14 | 30 | 23 | Good | 0.5 | Good | Good | 3H | Good |
| Example 3 | 60 | 40 | 0 | 23 | Good | 0.5 | Good | Good | 3H | Good |
| Example 4 | 60 | 40 | 0 | 23 | Good | 0.5 | Good | Good | 3H | Good |
| Example 5 | 39 | 0 | 61 | 23 | Good | 0.4 | Good | Good | 3H | Good |
| Example 6 | 39 | 0 | 40 (other monomer M315; 21) | 23 | Good | 0.4 | Good | Good | 3H | Good |
| Example 7 | 65 | 0 | 35 | 30 | Excellent | 0.5 | Good | Good | 3H | Good |
| Example 8 | 65 | 0 | 35 | 10 | Good | 0.3 | Good | Good | 3H | Good |
| Comparative Example 1 | 20 | 0 | 80 | 23 | Poor | 0.4 | Good | Good | 3H | Poor |
| Comparative Example 2 | 6.5 | 0 | 94.5 | 23 | Poor | 0.4 | Good | Good | 3H | Poor |
| Comparative Example 3 | 0 | 0 | 100 | 23 | Poor | 0.4 | Good | Good | 3H | Poor |
| Comparative Example 4 | 0 | 100 | 0 | 23 | Poor | 0.4 | Good | Good | 3H | Poor |
| Comparative Example 5 | 0 | 0 | 0 | 23 | Poor | 1.1 | Poor | Poor | H | Poor |
| Comparative Example 6 | 0 | 0 | 0 | 23 | Poor | 0.9 | Poor | Good | H | Poor |
| Comparative Example 7 | 65 | 0 | 35 | 5 | Poor | 0.4 | Good | Good | 3H | Good |
| Comparative Example 8 | 65 | 0 | 35 | 23 (ATO) | Good | 1.5 | Poor | Acceptable | 3H | Poor |
| Comparative Example 9 | 60 | 40 | 0 | 46 | Excellent | 0.8 | Poor | Acceptable | 3H | Poor |
| Comparative Example 10 | 60 | 40 | 0 | 70 | Excellent | 1.5 | Poor | Poor | 2H | Poor |
| Comparative Example 11 | 80 | 20 | 0 | 23 | Good | 0.6 | Good | Poor | 3H | Good |
| Comparative Example 12 | 65 | 0 | 35 | 23 | Good | 0.5 | Good | Poor | H | Poor |
| Comparative Example 13 | 65 | 0 | 35 | 23 | — | — | — | — | — | — |
| Comparative Example 14 | 65 | 0 | 35 | 23 | — | — | — | — | — | — |

According to Table 2, in the optical layered bodies of Examples, antimony pentoxide was dispersed while forming a three-dimensional net structure in the hard coat layer, and the optical layered bodies were superior in antistatic properties and had good haze. FIG. 1 shows a TEM photograph of a cross section of the hard coat layer of the optical layered body according to Example 1. The scale shown in FIG. 1 is 100 nm for each scale.

Figure 2:
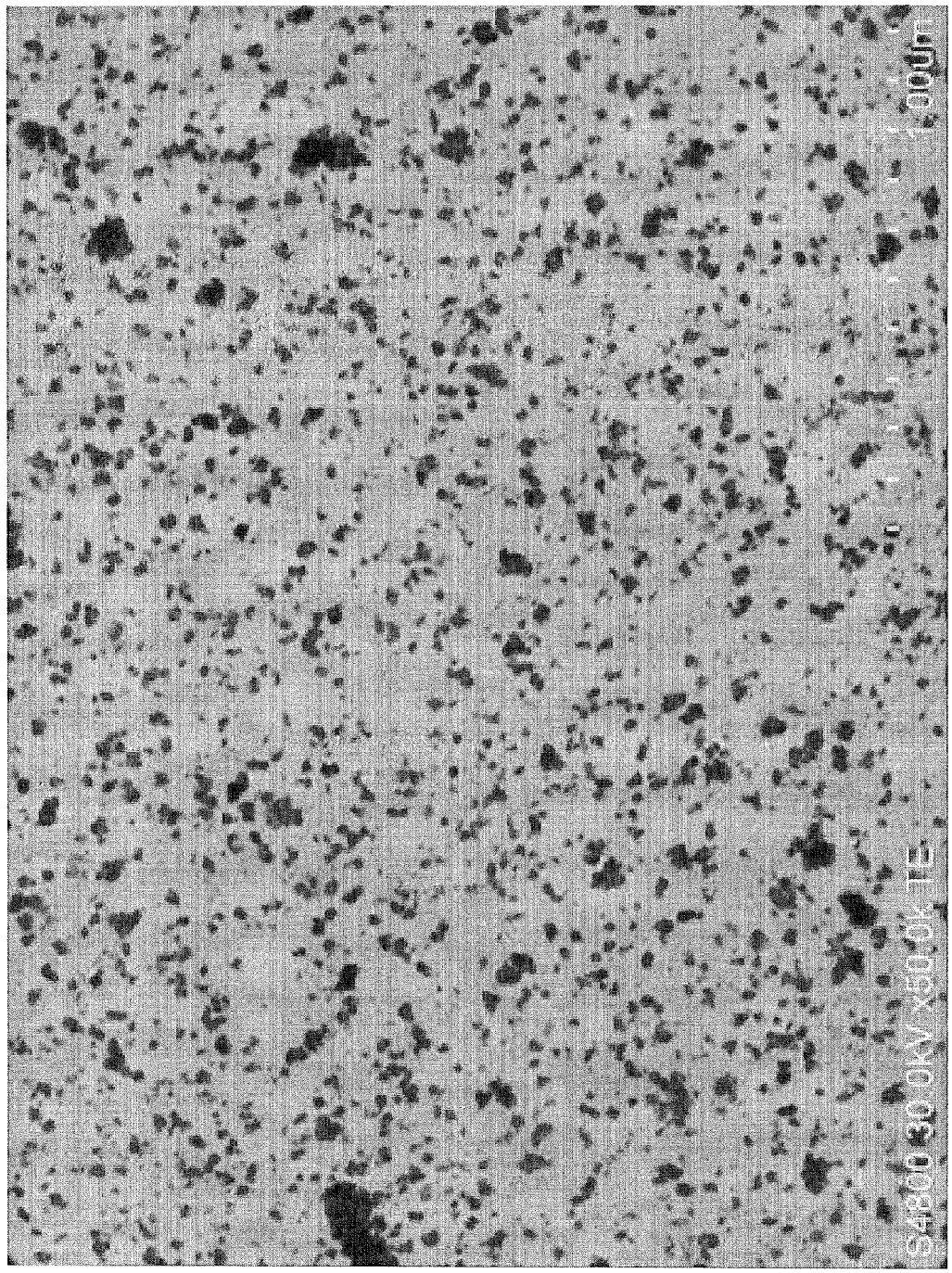
FIG. 2 is a TEM photograph of a cross section of a hard coat layer of an optical layered body according to Comparative Example 1.

On the other hand, in any of the optical layered bodies of Comparative Examples 1 to 7, antimony pentoxide was not dispersed while forming a three-dimensional net structure in the hard coat layer, and each of the optical layered body had a high surface resistance value and was inferior in antistatic properties. FIG. 2 shows a TEM photograph of a cross section of the hard coat layer of the optical layered body according to Comparative Example 1. The scale shown in FIG. 2 is 100 nm for each scale.

The optical layered body of Comparative Example 8 using ATO as the antistatic material had slightly high haze and was inferior in total light transmittance and adhesion of the hard coat layer to the substrate and the low refractive index layer although having the same antistatic properties as those of the optical layered body of Example 1.

The optical layered bodies of Comparative Examples 9 and 10 using antimony pentoxide in a large amount were inferior in haze and total light transmittance and also inferior in adhesion of the hard coat layer to the substrate and the low refractive index layer. The optical layered body of Comparative Example 10 was further inferior in adhesion of the hard coat layer to the light-transmitting substrate.

The optical layered body of Comparative Example 11 using ultraviolet-curable urethane acrylate in a large amount was inferior in adhesion of the hard coat layer to the light-transmitting substrate.

The optical layered body of Comparative Example 12 using bifunctional ultraviolet-curable urethane acrylate in a large amount was inferior in adhesion of the hard coat layer to the light-transmitting substrate and also inferior in hardness of the hard coat layer.

INDUSTRIAL APPLICABILITY

The optical layered body of the present invention can be used suitably for high definition displays such as a liquid crystal display (LCD), a plasma display (PDP), an electroluminescence display (ELD), a touch panel, and electronic paper.

The invention claimed is:
1. An optical layered body comprising a light-transmitting substrate and a hard coat layer on at least one surface of the light-transmitting substrate,
wherein the hard coat layer contains antimony pentoxide and a hexa- or higher functional urethane (meth)acrylate oligomer with a weight average molecular weight of not lower than 1000 and lower than 10000;

a content of the antimony pentoxide is 7 to 35% by mass in the hard coat layer;

a content of the urethane (meth)acrylate oligomer is 30 to 70% by mass in the hard coat layer;

the antimony pentoxide is dispersed in the hard coat layer while forming a three-dimensional net structure; and the optical layered body has a haze of not higher than 0.7%.

2. The optical layered body according to claim 1, wherein the hard coat layer further contains at least one compound selected from the group consisting of pentaerythritol tri(meth)acrylate, dipentaerythritol hexa(meth)acrylate, pentaerythritol tetra(meth)acrylate, and trimethylolpropane tri(meth)acrylate.

3. The optical layered body according to claim 2, wherein the hard coat layer contains 30 to 70% by mass of pentaerythritol tri(meth)acrylate and/or dipentaerythritol hexa(meth)acrylate.

4. The optical layered body according to claim 1, further comprising a low refractive index layer on the hard coat layer.

5. A polarizer comprising a polarizing element having a polarizing element surface, wherein the polarizer comprises the optical layered body according to claim 1, on the polarizing element surface.

6. An image display device comprising the optical layered body according to claim 1.

7. An image display device comprising a polarizer having a polarizing element having a polarizing element surface, wherein the polarizer includes the optical layered body according to claim 1 on the polarizing element surface.

* * * * *